US010615836B1

(12) United States Patent
Akens et al.

(10) Patent No.: US 10,615,836 B1
(45) Date of Patent: Apr. 7, 2020

(54) RADIO WITH CUSTOMIZABLE EXTERNAL HOUSING

(71) Applicant: MOTOROLA SOLUTIONS, INC., Chicago, IL (US)

(72) Inventors: Jody H. Akens, Weston, FL (US); Steven Gilmore, Plantation, FL (US); Anthony M. Kakiel, Coral Springs, FL (US); William Robertson, Pompano Beach, FL (US); Adrian F. Rubio, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/227,579

(22) Filed: Dec. 20, 2018

(51) Int. Cl.
*H04B 1/3827* (2015.01)
*H04B 1/38* (2015.01)

(52) U.S. Cl.
CPC ... *H04B 1/3833* (2013.01); *H04B 2001/3894* (2013.01)

(58) Field of Classification Search
CPC .................................. H05K 5/06; H04B 1/3833
See application file for complete search history.

(56) References Cited

U.S. PATENT DOCUMENTS

| | | | |
|---|---|---|---|
| 6,847,806 B2 | 1/2005 | Curtis et al. | |
| 7,414,855 B1 | 8/2008 | Arnold | |
| 7,829,786 B2 | 11/2010 | Fuerstenberg et al. | |
| 10,014,898 B2 | 7/2018 | Crawford et al. | |
| 2004/0097276 A1 | 5/2004 | Harmon | |
| 2005/0130721 A1 | 6/2005 | Gartrell | |
| 2008/0174508 A1* | 7/2008 | Iwai | H01Q 9/30 343/850 |
| 2009/0071748 A1* | 3/2009 | Fuerstenberg | H05K 5/06 181/292 |
| 2015/0196456 A1* | 7/2015 | Nicholson | A61H 33/005 349/12 |
| 2016/0212526 A1* | 7/2016 | Salvatti | H04R 1/44 |

* cited by examiner

*Primary Examiner* — Hsinchun Liao
(74) *Attorney, Agent, or Firm* — Michael Best & Friedrich LLP

(57) ABSTRACT

A radio includes an inner radio core having a main frame assembly and at least one water-sealed sub-assembly sealed to the main frame assembly. The inner radio core is an independently testable and functional radio. The radio further includes at least one customizable housing component configured to be releasably coupled to the inner radio core via at least one hook, tab, or fastener.

20 Claims, 18 Drawing Sheets

US 10,615,836 B1

RADIO WITH CUSTOMIZABLE EXTERNAL HOUSING

BACKGROUND OF THE INVENTION

Radio devices such as, for example, two-way radios, land mobile radios, and the like are often subjected to contact with water. The radio devices, including their external housings, are assembled and sealed and then tested after final assembly to ensure that they are fully functional, and that they are appropriately sealed to prevent ingress and damage from water. Any customization of the radio devices and their housings after assembly thus requires disassembly, and breaking of the water-sealed structure of the device. Accordingly, there is a need for an improved radio external housing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
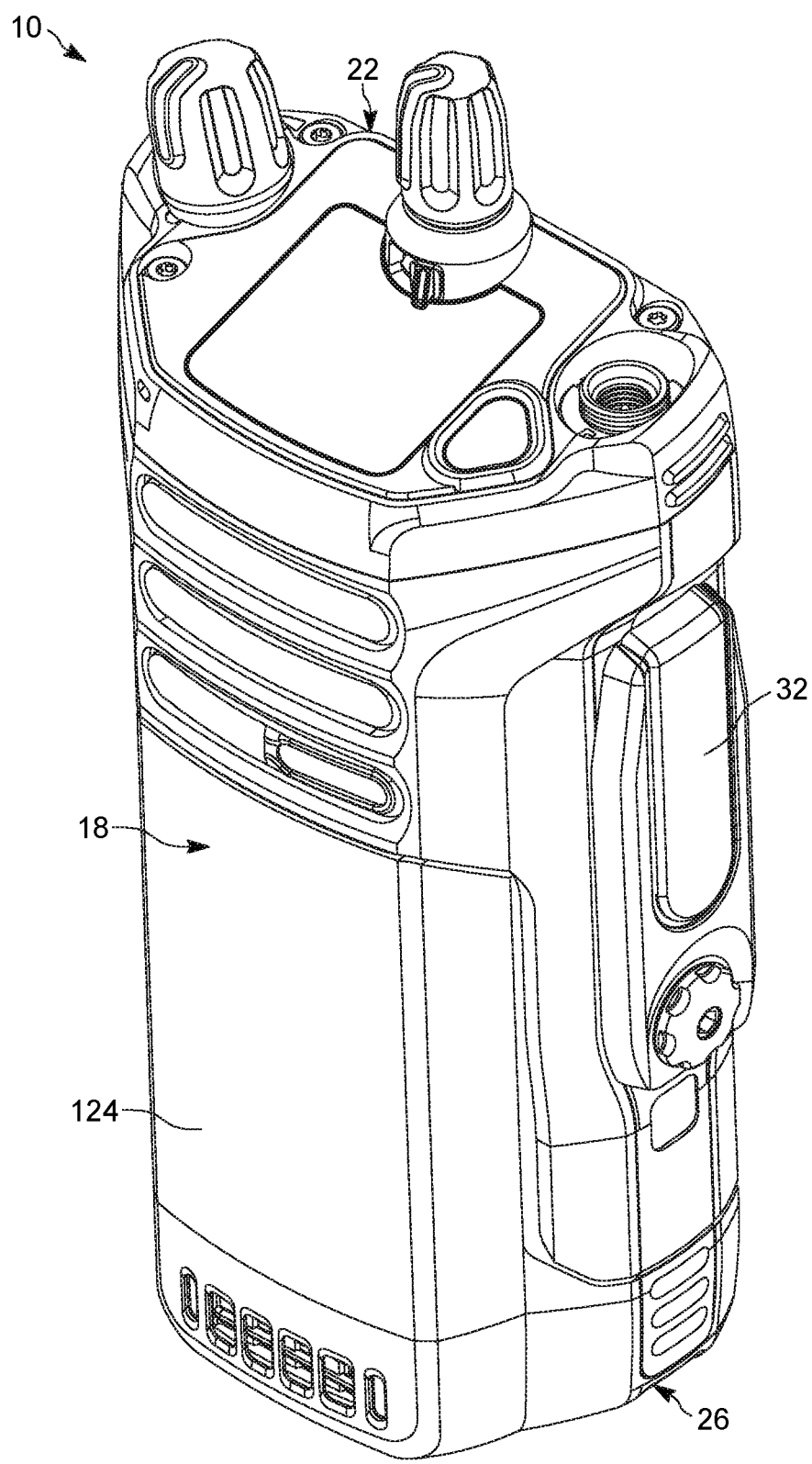
FIGS. 1 and 2 are front and rear perspective views, respectively, of a radio device in accordance with one embodiment.
Figure 2:
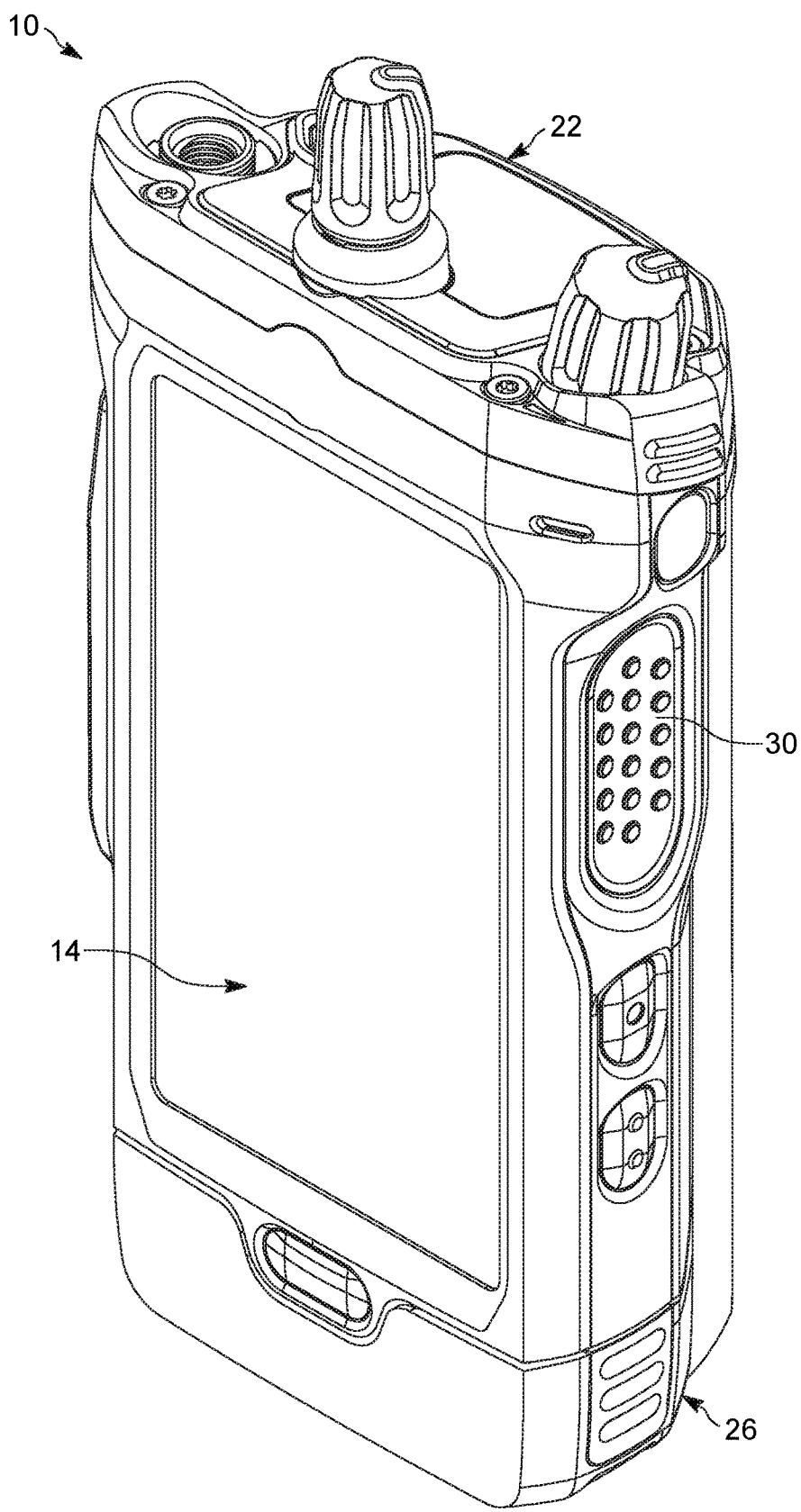
Figure 3:
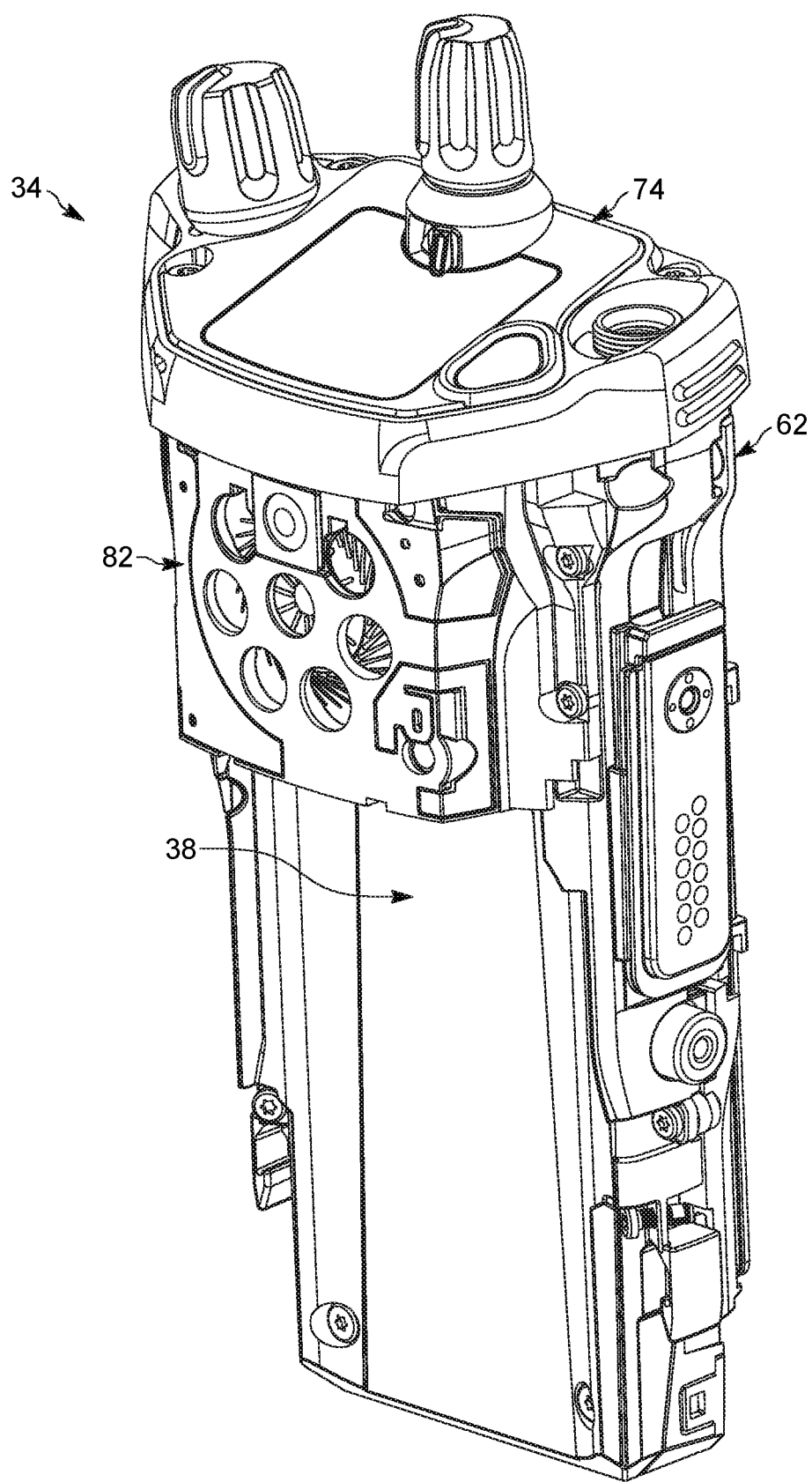
FIG. 3 is a perspective view of an inner radio core of the radio device.
Figure 4:
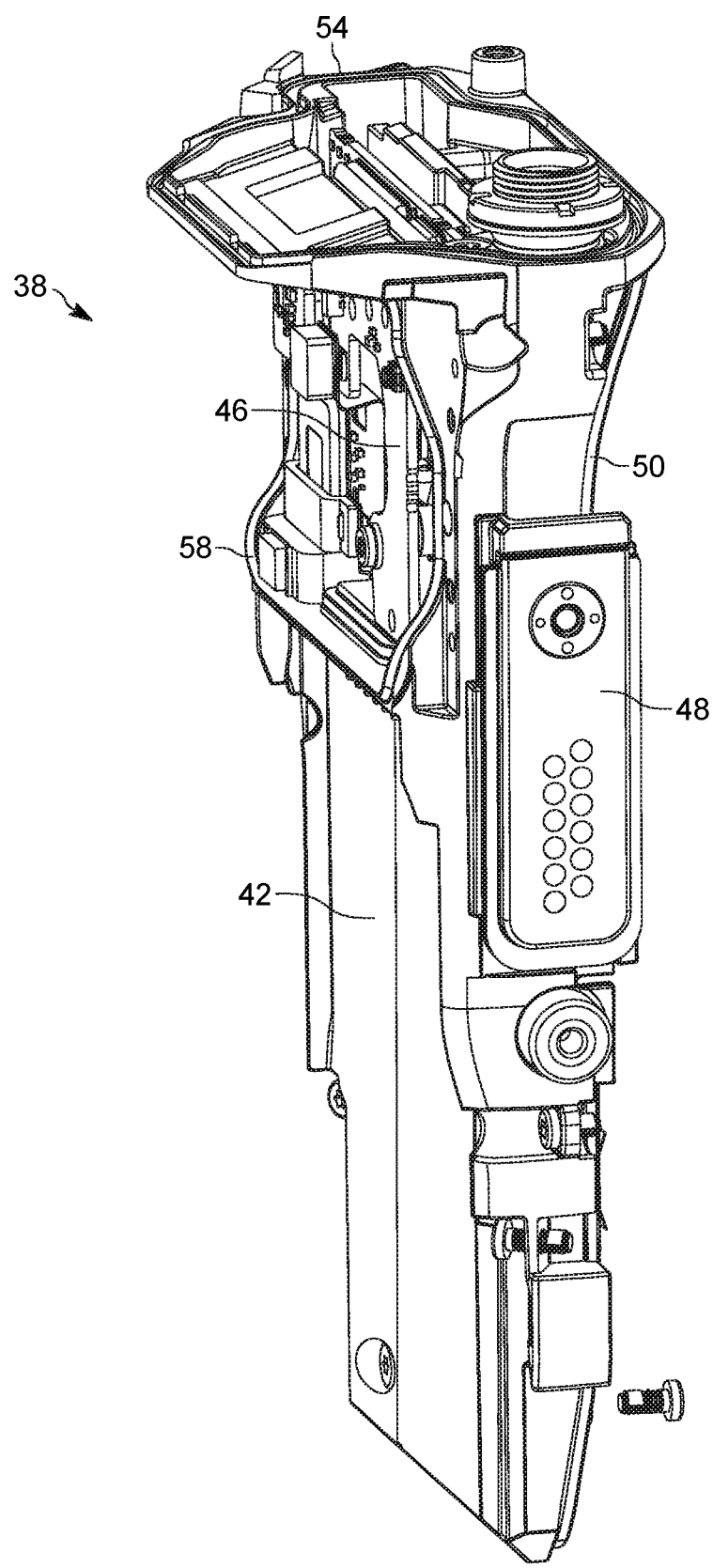
FIG. 4 is a perspective view of a main frame assembly of the inner radio core.
Figure 5:
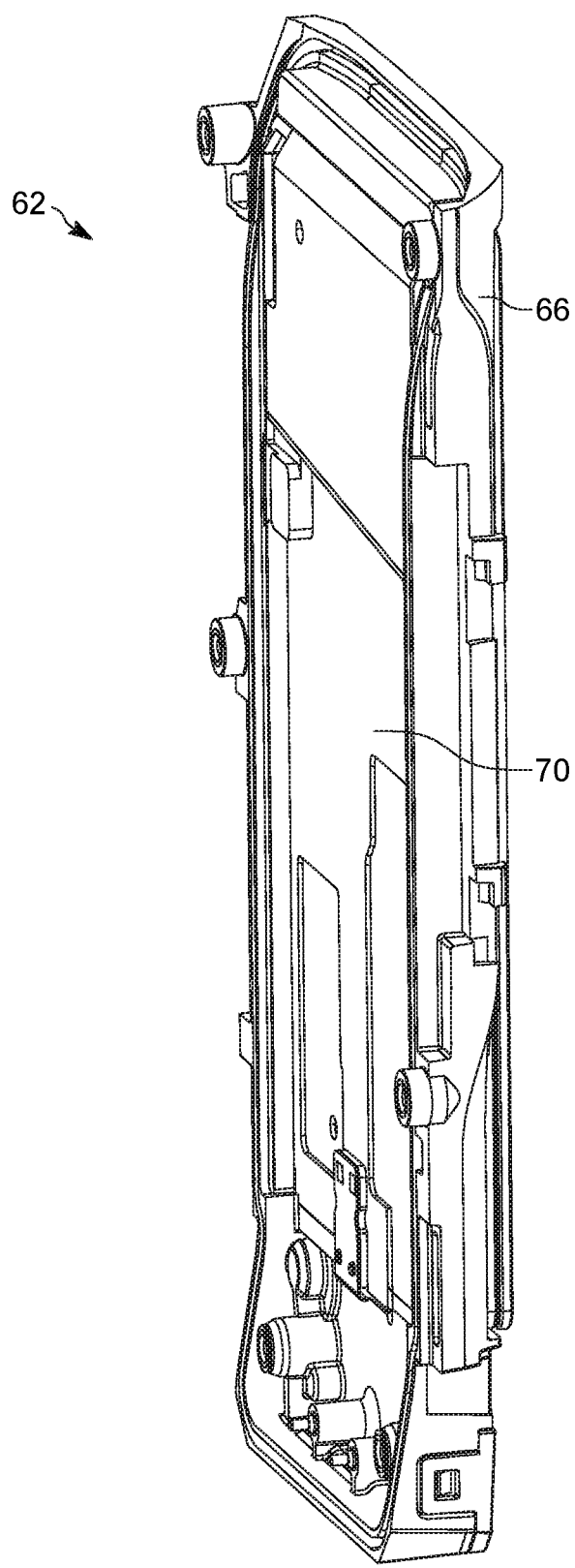
FIG. 5 is a perspective view of a display sub-assembly of the inner radio core.
Figure 6:
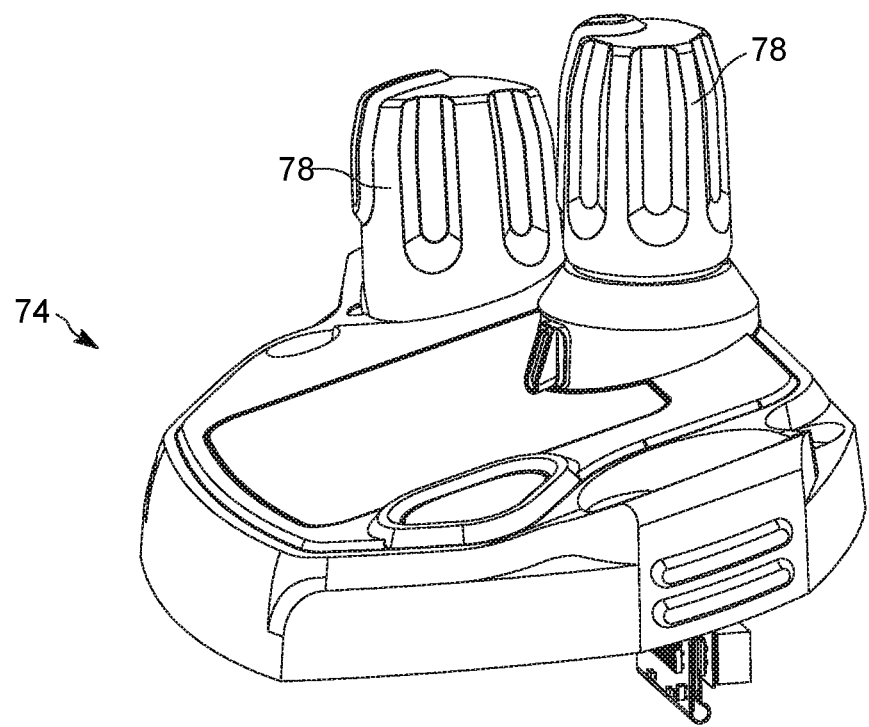
FIG. 6 is a perspective view of a top sub-assembly of the inner radio core.
Figure 7:
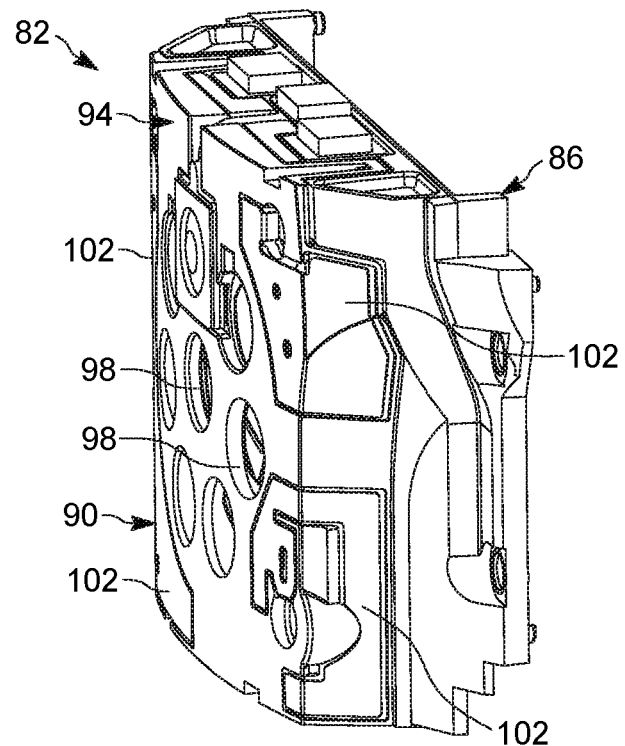
FIG. 7 is a perspective view of a loudspeaker and antenna sub-assembly of the inner radio core.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A radio includes an inner radio core having a main frame assembly and at least one water-sealed sub-assembly sealed to the main frame assembly. The inner radio core is an independently testable and functional radio. The radio further includes at least one customizable housing component configured to be releasably coupled to the inner radio core via at least one hook, tab, or fastener.

A method of assembling and testing a radio includes providing a plurality of seals along perimeter portions of a main frame assembly, and providing independent sealing to a plurality of radio sub-assemblies to form a plurality of independently water-sealed sub-assemblies, the plurality of water-sealed sub-assemblies being attachable to the main frame assembly. The method further includes attaching the water-sealed sub-assemblies to the sealed main frame assembly, thereby sealing the water-sealed sub-assemblies to the main frame assembly to form a fully functional inner radio core. The method further includes electrically and mechanically testing the inner radio core, and attaching at least one customizable exterior housing to the inner radio core after conducting the testing.

FIGS. 1-9 illustrate one example of a portable radio device 10. As illustrated in FIG. 1, the radio device 10 generally includes a front display region 14, a rear battery and speaker region 18, a top region 22, a bottom region 26, and side regions 30, 32. The radio device 10 may be used for example in a variety of environments, including those where the radio device 10 is subjected to water.

With reference to FIGS. 3-7, the radio device 10 includes an inner radio core 34 (FIG. 3) that is an independently testable and functional radio on its own. The inner radio core 34 includes a main frame assembly 38 (FIG. 4) having a body 42, a printed circuit board (PCB) 46 coupled to the body 42, and an accessory connector 48 coupled to the body 42 (a push-to-talk button may be located on the opposite side from that of the accessory connector 48). A front perimeter seal 50, a top perimeter seal 54, and a rear perimeter seal 58 are each coupled to the body 42 and/or the PCB 46. In the illustrated embodiment the seals 50, 54, 58 are each self-retained silicone seals, although other embodiments include different sealing structures than that illustrated.

With continued reference to FIGS. 3-7, the inner radio core 34 further includes a water-sealed display sub-assembly 62 (FIG. 5) sealed to the main frame assembly 38 via direct physical contact with the front perimeter seal 50. The display sub-assembly 62 includes for example a body 66 and a display 70 coupled to the body 66.

The inner radio core 34 further includes a water-sealed top sub-assembly 74 (FIG. 6) sealed to the main frame assembly 38 via direct physical contact with the top perimeter seal 54. The top sub-assembly 74 may include for example knobs 78 that are used to control volume, channel selection, and the like.

The inner radio core 34 further includes a loudspeaker and antenna sub-assembly 82 sealed to the main frame assembly 38 via direct physical contact with the rear perimeter seal 58. The loudspeaker and antenna sub-assembly 82 includes for example a loudspeaker 86 and an antenna assembly 90 coupled to the loudspeaker 86. The antenna assembly 90 includes a speaker cover 94 with speaker ports 98, and antenna elements 102 coupled to the speaker cover 94.

With reference to FIGS. 8-23, the radio device 10 includes at least one customizable (for example modular) housing component releasably coupled to the inner radio core 34 via at least one hook, tab, or fastener. The customizable housing components may made partially or entirely of plastic (or other suitable material), and may come in a variety of different colors depending upon an intended use of the radio device 10.

Figure 8:
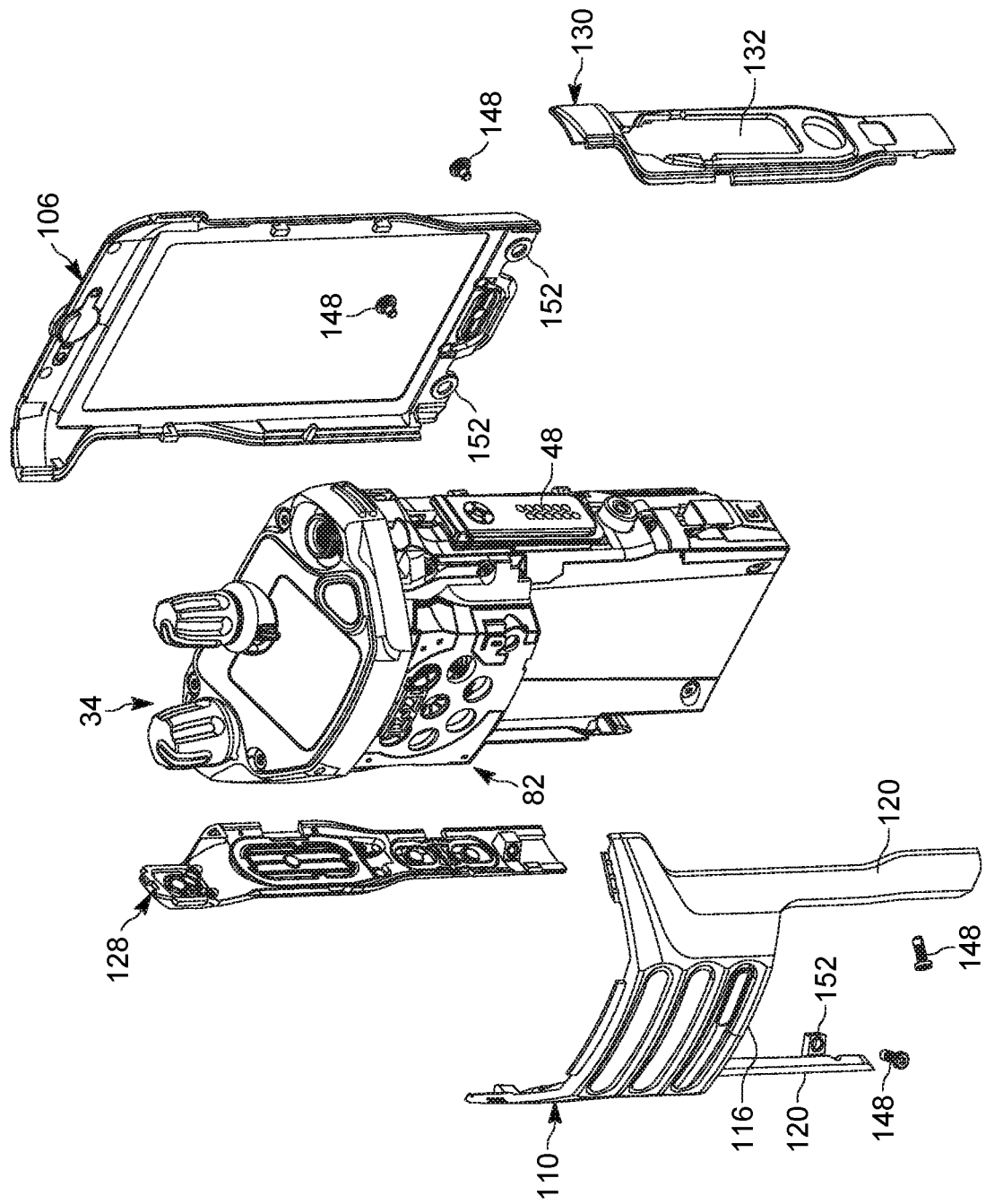
FIG. 8 is a perspective, exploded view of the radio device, illustrating front, rear, and side customizable housing components that couple to the inner radio core.
Figure 9:
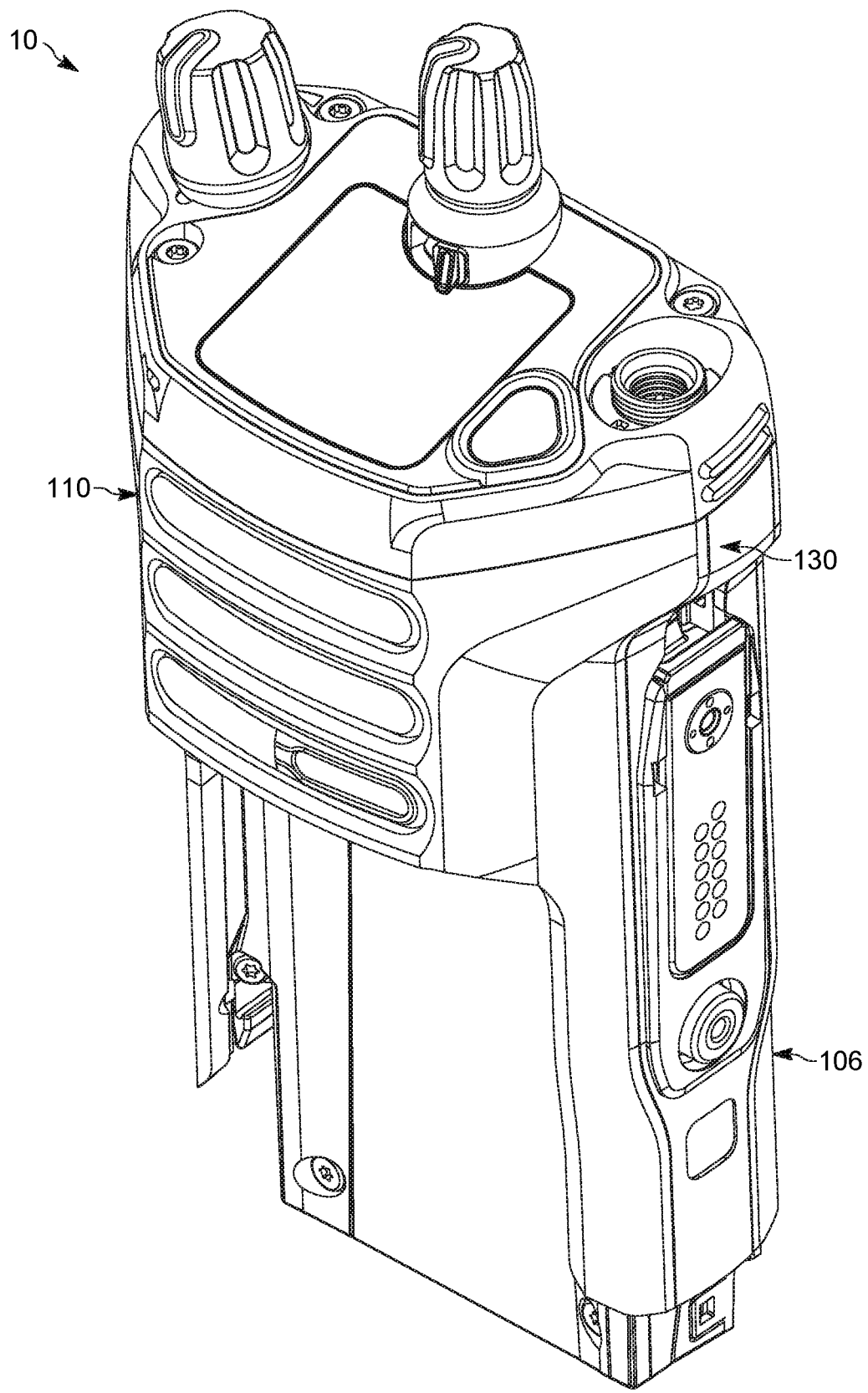
FIGS. 9-11 are perspective views of the radio device with different colored customizable housing components coupled to the inner radio core, with a battery removed.

For example, as illustrated in FIG. 8, in the illustrated embodiment the radio device 10 includes a front customizable housing component 106, or bezel, that at least partially covers the display sub-assembly 62. In the illustrated embodiment, the front housing component 106 covers the body 66 of the display sub-assembly 62.

The radio device 10 further includes a rear customizable housing component 110, or bezel (for example speaker bezel), that at least partially covers the loudspeaker and antenna sub-assembly 82. In the illustrated embodiment the rear housing component 110 includes a top member 116 that covers the loudspeaker 86, and two legs 120 extending below the top member 116 that provide alignment for a battery 124 (FIG. 1).

The radio device 10 further includes side customizable housing components 128, 130, or bezels, that extend between the front and rear housing components 106, 110. As illustrated in FIG. 8, one of the side housing components 130 may include an aperture 132 to accommodate the accessory connector 48.

Figure 10:
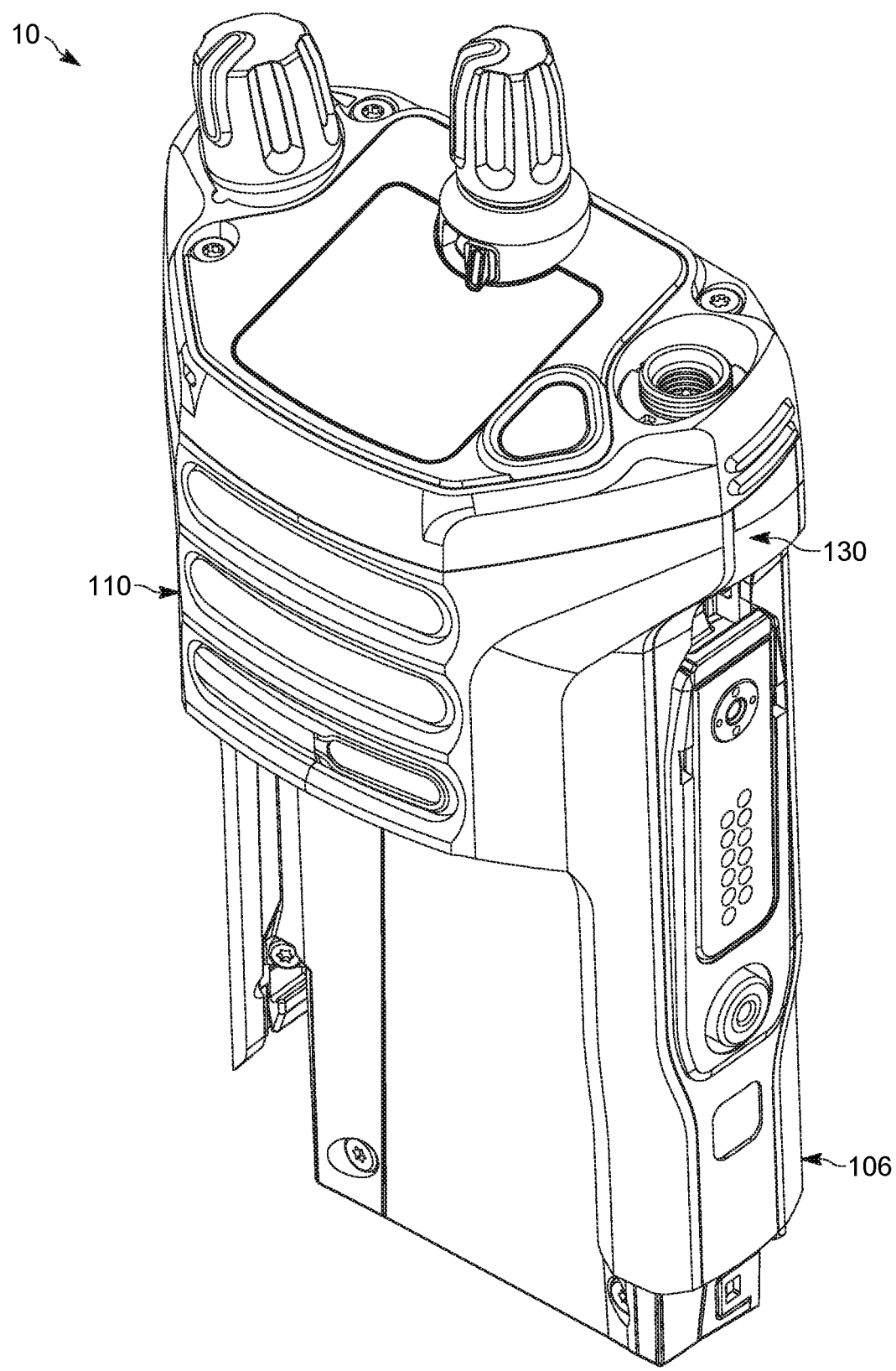
Figure 11:
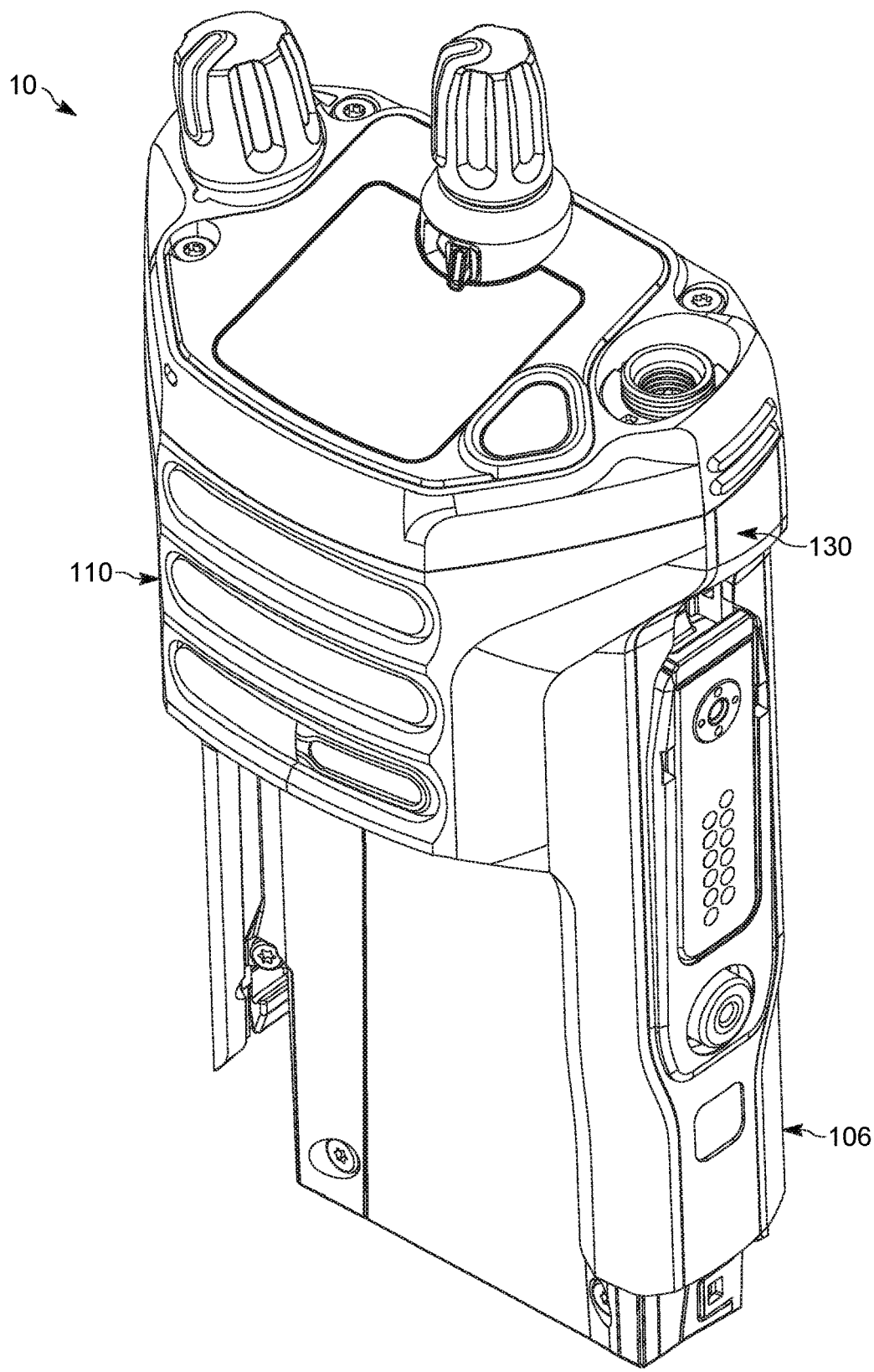

As described above, the customizable housing components may come in a variety of different colors depending upon an intended use of the radio device 10. For example, with reference to FIG. 9, the front, rear, and side housing components 106, 110, 128, 130 may each be a first color (for example blue) if the device 10 is to be used for a first intended purpose or in a first intended environment. With reference to FIG. 10, the front, rear, and side housing components 106, 110, 128, 130 may each be a second color different from the first color (for example yellow) if the device is to be used for a second intended purpose or in a second intended environment different than the first intended purpose or environment. In other embodiments the front, rear, and side housing components 106, 110, 128, 130 may each be a third color different than the first or second colors, and the like. Other embodiments include different color combinations. For example, with reference to FIG. 11, in some embodiments the front and rear housing components 106, 110 are a first color (for example black) and the side housing components 128, 130 are a second color (for example green). The different colors and color combinations may provide a clear indication of the intended use or environment within which the radio device 10 is to be used.

As described above, each of the customizable housing components is also releasably coupled to the water-sealed inner radio core 34. Accordingly, the customizable housing components may easily be removed and replaced as desired. For example, once the water-sealed inner radio core 34 has been fully tested as a radio (for example via testing to ensure water-tight seals, as well as testing of the antennas and other parametrically measured performance factors and the like), the inner radio core 34 may be delivered to a particular setting or environment of use, where a desired color of housing components may then be coupled to the inner radio core 34.

Figure 12:
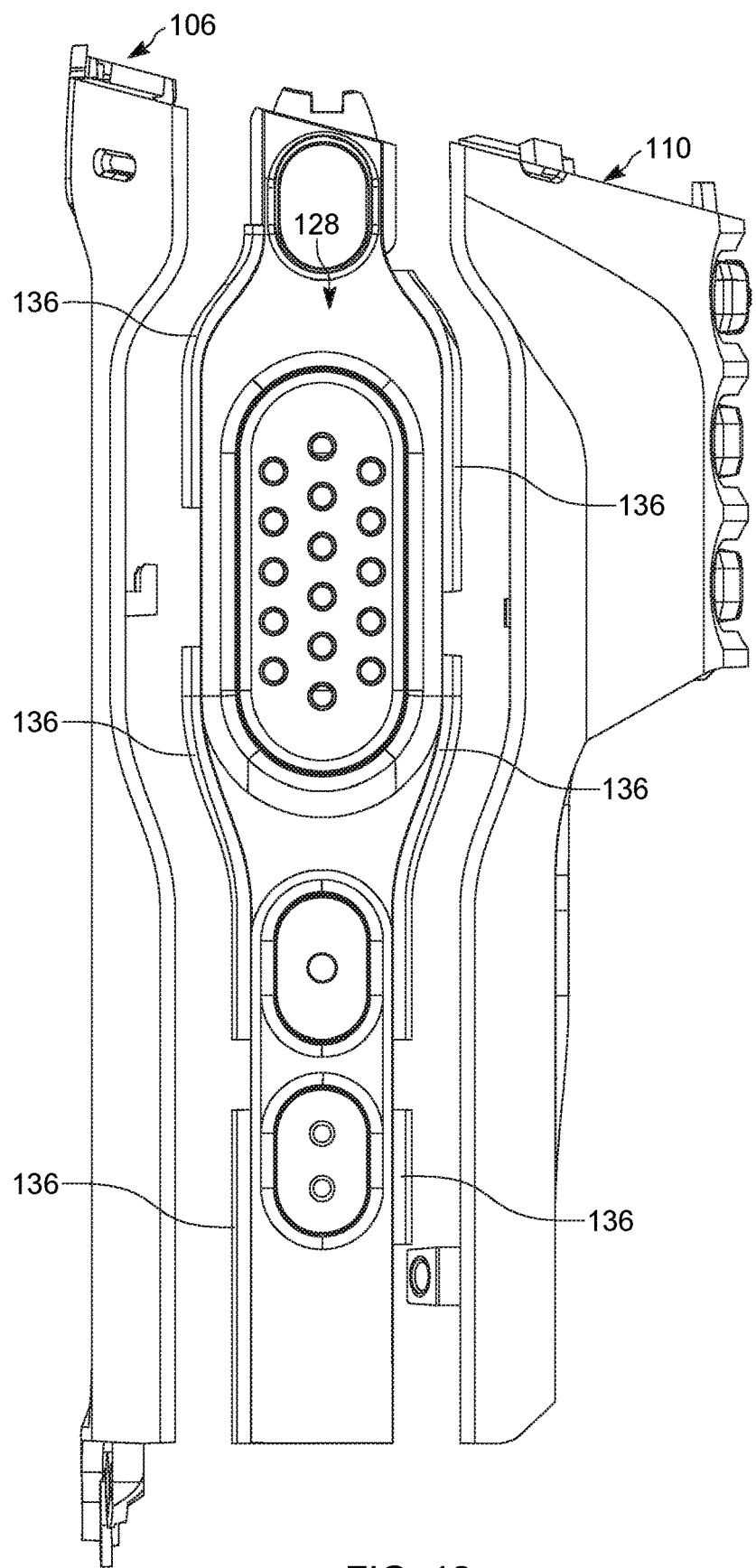
FIGS. 12-14 are exploded side and perspective views of the customizable housing components, illustrating overlapping tabs that are used to couple the customizable housing components to each other and/or to the inner radio core.
Figure 13:
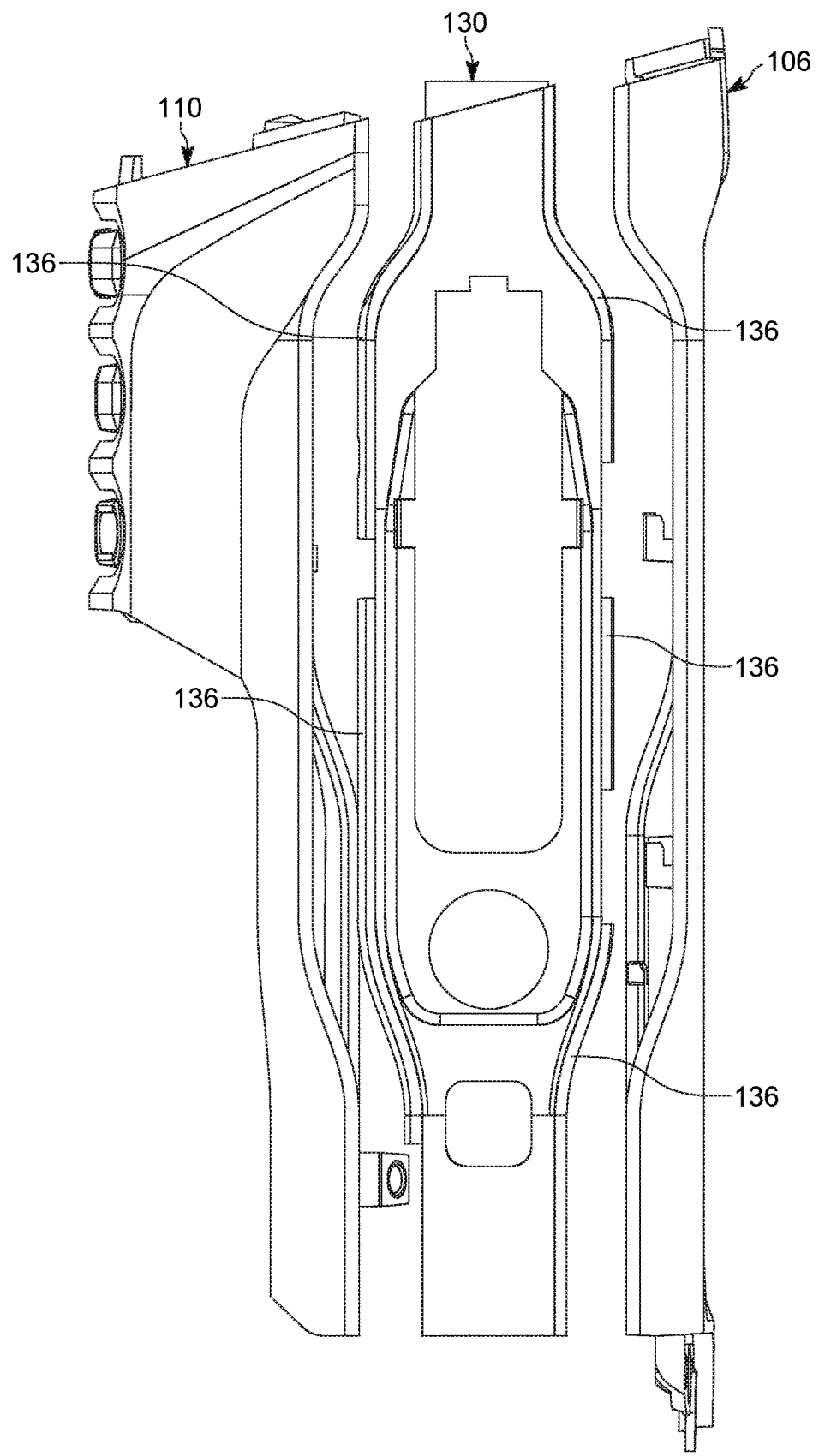
Figure 14:
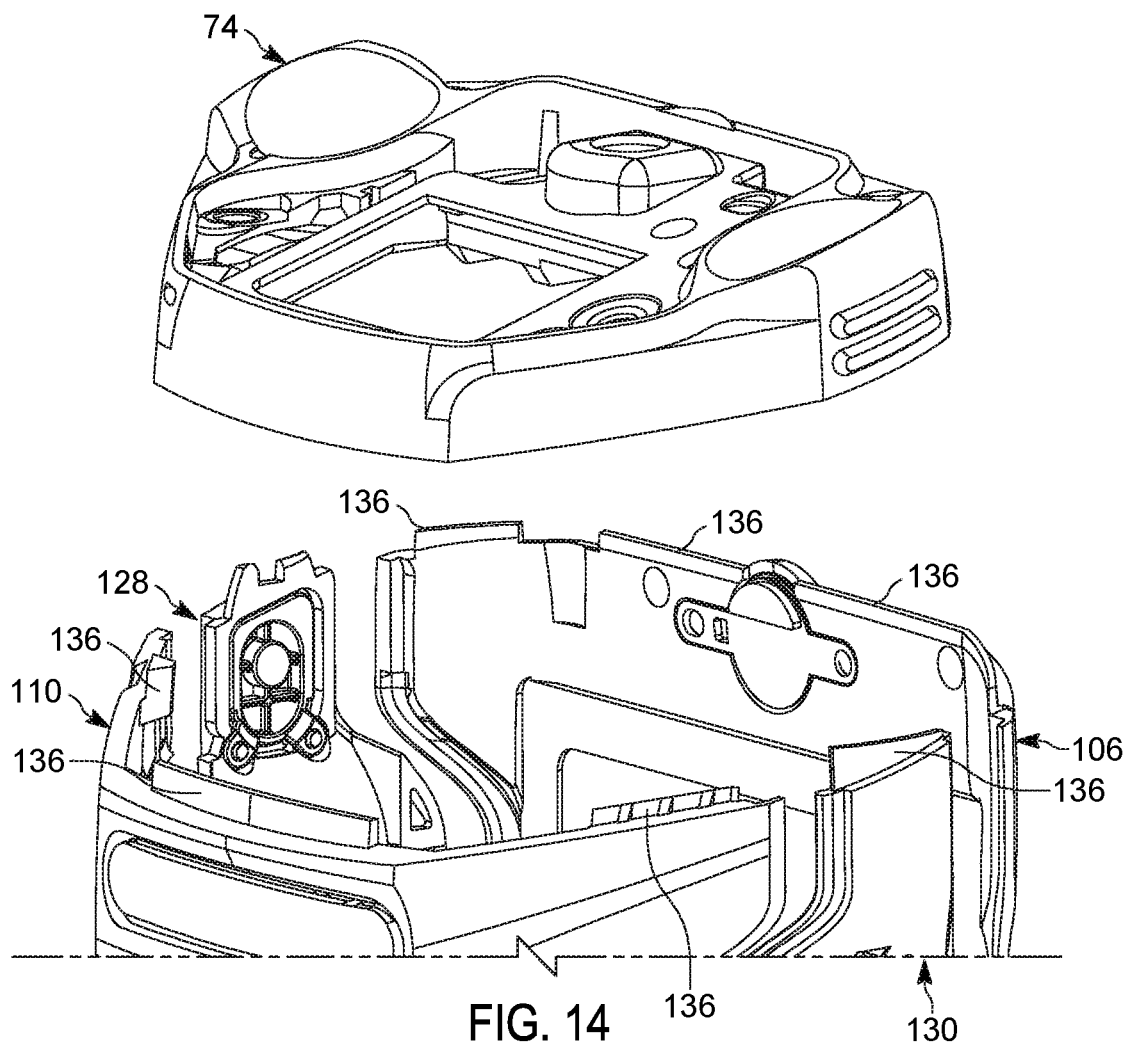

With reference to FIGS. 12-14, in some embodiments the customizable housing components include overlapping tabs that are used to couple and/or align the customizable housing components relative to each other and/or to the inner radio core 34. For example, as illustrated in FIGS. 12 and 13, the side housing components 128, 130 may include outer elongate tabs 136 along peripheries of the side housing components 128, 130. The tabs 136 may align with (for example slide under or over) corresponding peripheral regions (for example edges or other tabs or grooves or pockets) of the front and rear housing components 106, 110.

As illustrated in FIG. 14, the front, rear, and side housing components 106, 110, 128, 130 may also or alternatively include tabs 136 along upper regions of the housing components. The tabs 136 align with corresponding peripheral regions (for example edges or other tabs or grooves or pockets) of the top sub-assembly 74 (only a portion of the top sub-assembly 74 being illustrated in FIG. 14).

With reference to FIGS. 15-18, in some embodiments the customizable housing components include hooks and/or fasteners that are used to couple the customizable housing components to each other and/or to the inner radio core 34.

For example, in the illustrated embodiment the front housing component 106 includes four hooks 140 (FIG. 15) that hook behind or otherwise interlock onto corresponding hooks 144 (FIG. 16) on the inner radio core 34 (for example on the display sub-assembly 62). Similarly, the rear housing component 110 also includes two hooks 140 (FIG. 17) that hook behind or otherwise interlock onto corresponding hooks 144 (FIG. 18) on the inner radio core 34 (for example on the loudspeaker and antenna sub-assembly 82). Each of the hooks 140, 144 may have a generally "L" shape, "U" shape, stepped shape, or any other desired shape to provide an interlocking engagement between the hooks 140, 144. Other embodiments include different shapes and sizes of hooks 140, 144 than that illustrated, as well as different numbers and locations of hooks 140, 144 than that illustrated. Additionally, in some embodiments the side housing components 128, 130 may have hooks that hook onto the hooks 140 of the front housing component 106 and/or rear housing component 110.

With reference to FIGS. 19-23, in some embodiments fasteners are used to help secure the customizable housing components to each other and/or to the inner radio core 34.

Figure 19:
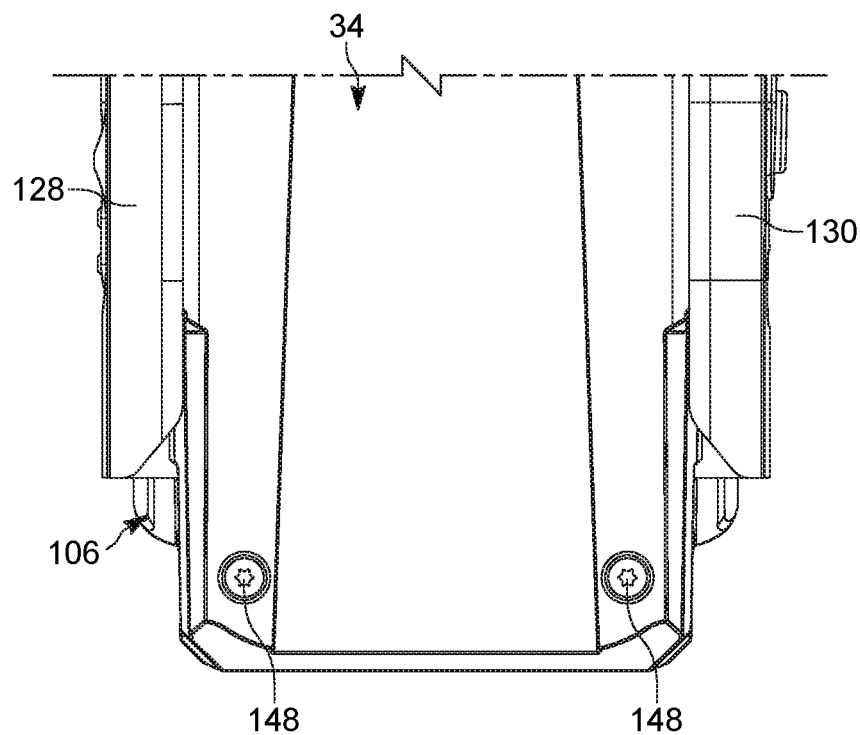
FIGS. 19-21 are front and perspective views of a portion of the radio device, illustrating fasteners used to secure the side customizable housing components to the rear customizable housing component, the fasteners being concealed from view when the radio device is viewed from a front of the device.
Figure 20:
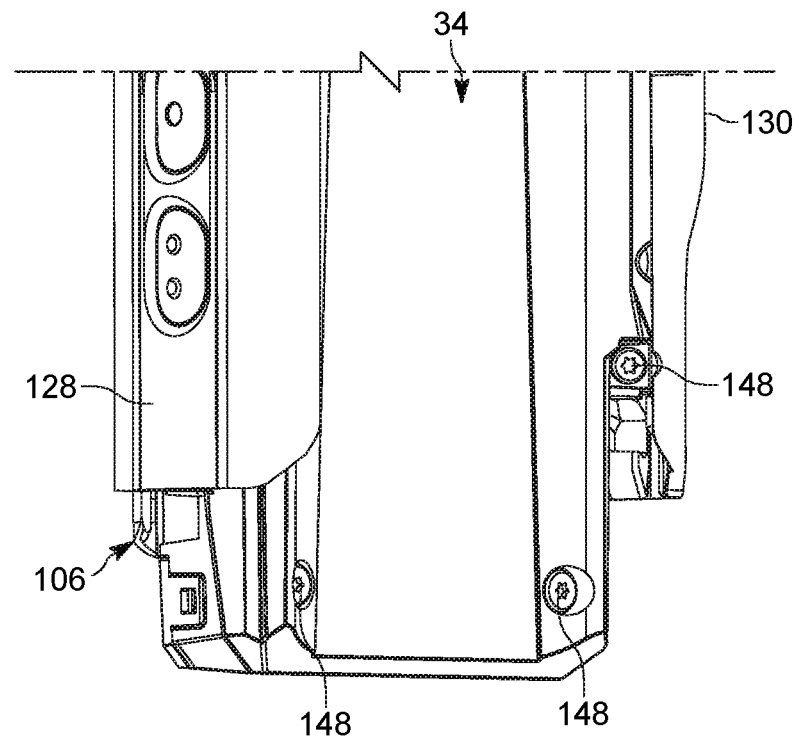
Figure 21:
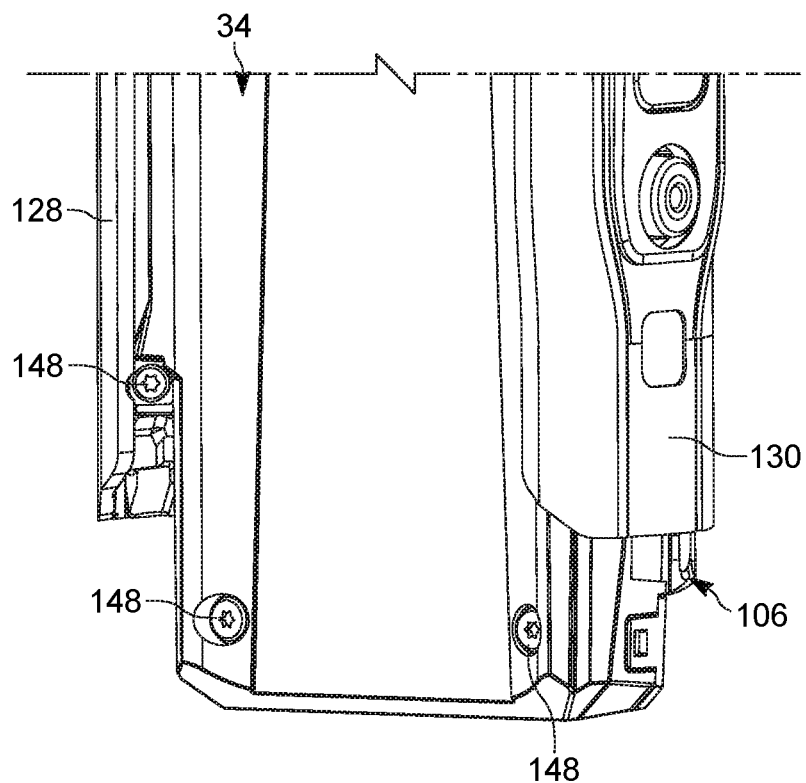
Figure 22:
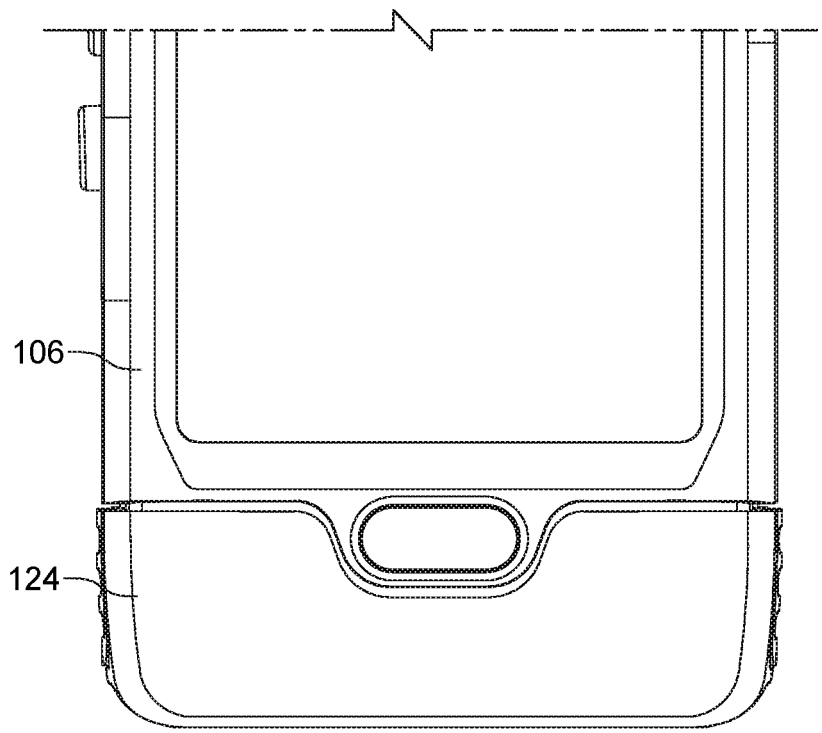
FIGS. 22 and 23 are rear views of a portion of the radio device, illustrating fasteners used to secure the front customizable housing component to the inner radio core, the fasteners being concealed from view by a battery.
Figure 23:
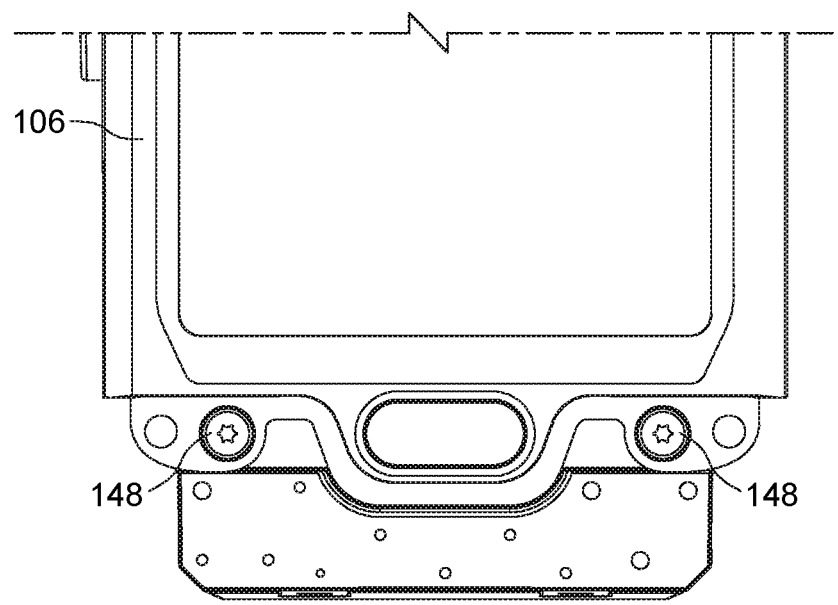

For example, in the illustrated embodiment fasteners 148 (for example screws) are used to secure the side housing components 128, 130 to the inner radio core 34 (FIGS. 19-21). The fasteners 148 are angled such that heads of the fasteners are concealed from view when the device 10 is viewed from the front (FIG. 19). Similarly, additional fasteners 148 are used to secure the front housing component 106 to the inner radio core 34. As illustrated in FIGS. 22 and 23, the fasteners 148 (or heads thereof) are concealed from view when the battery 124 is installed (FIG. 22). With reference to FIG. 8, in some embodiments additional fasteners 148 are similarly used to secure the rear housing component 110 to the inner radio core 34. For example, as illustrated in FIG. 8, the legs 120 may each be fastened with a separate fastener 148. In some embodiments, one or more fasteners 148 are also used to secure any of the housing components to each other.

Figure 15:
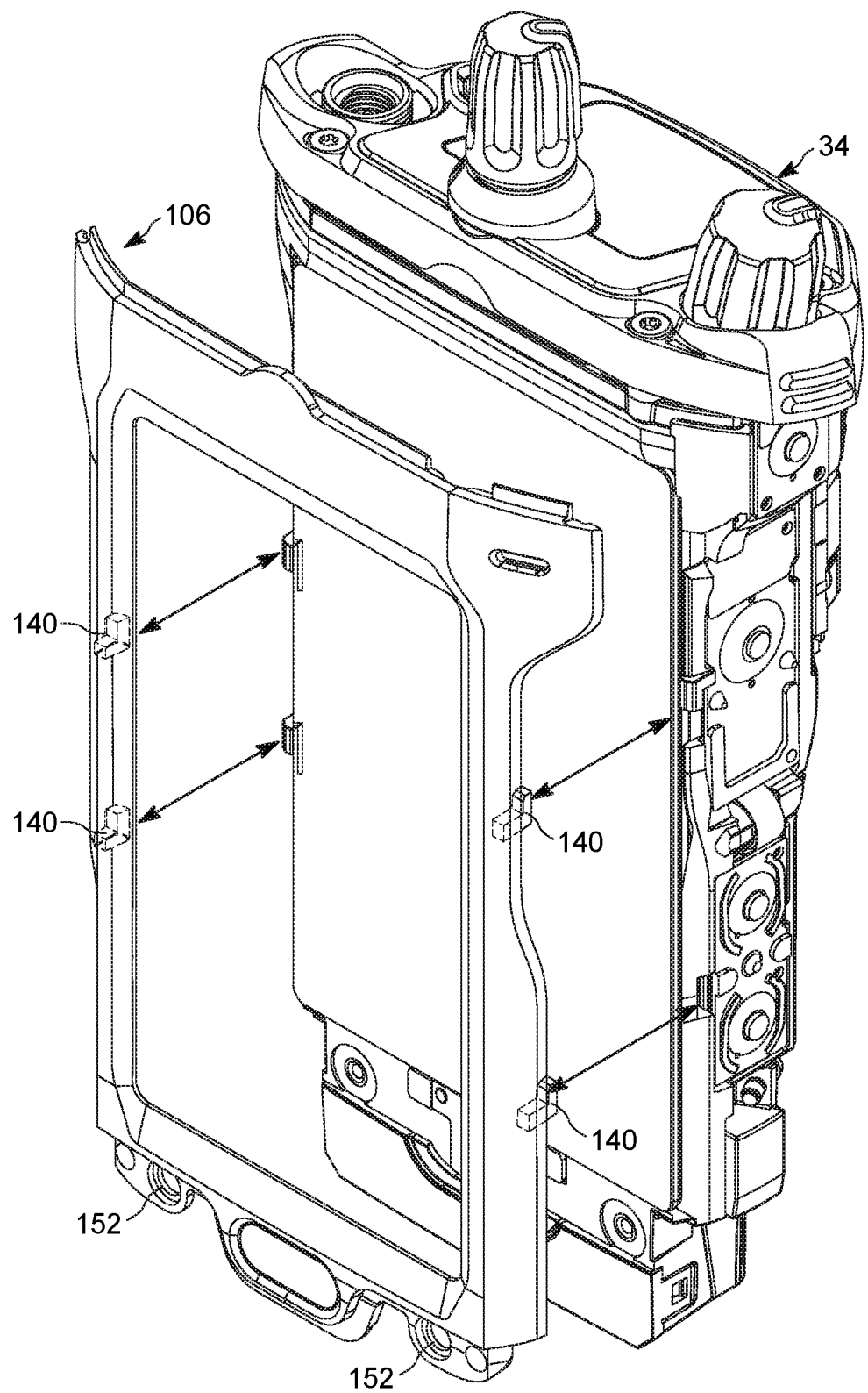
FIGS. 15-18 are perspective views of the customizable housing components, illustrating hooks and fasteners that are used to couple the customizable housing components to each other and/or to the inner radio core.
Figure 16:
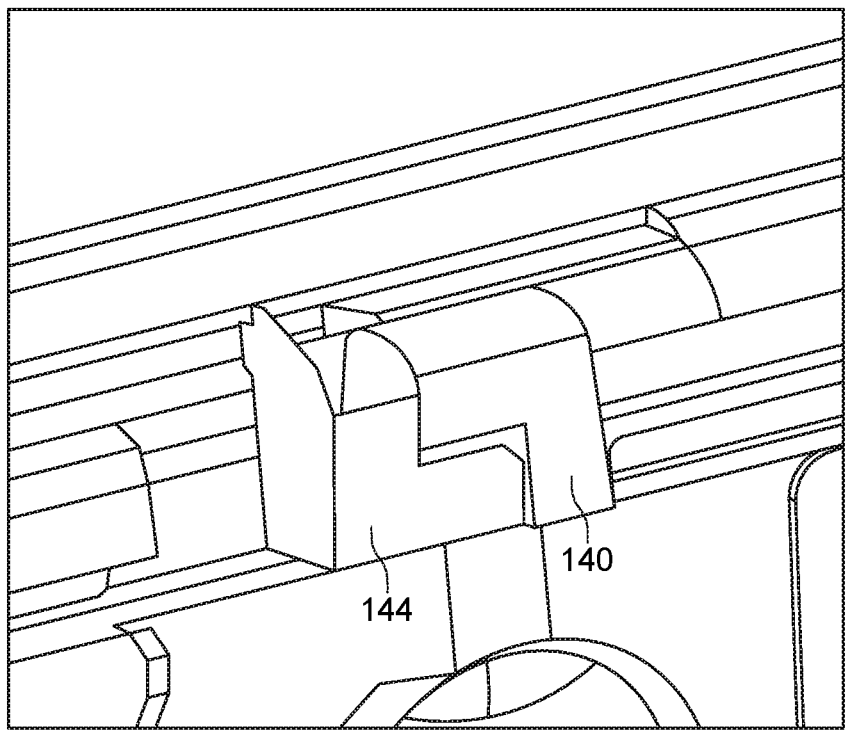
Figure 17:
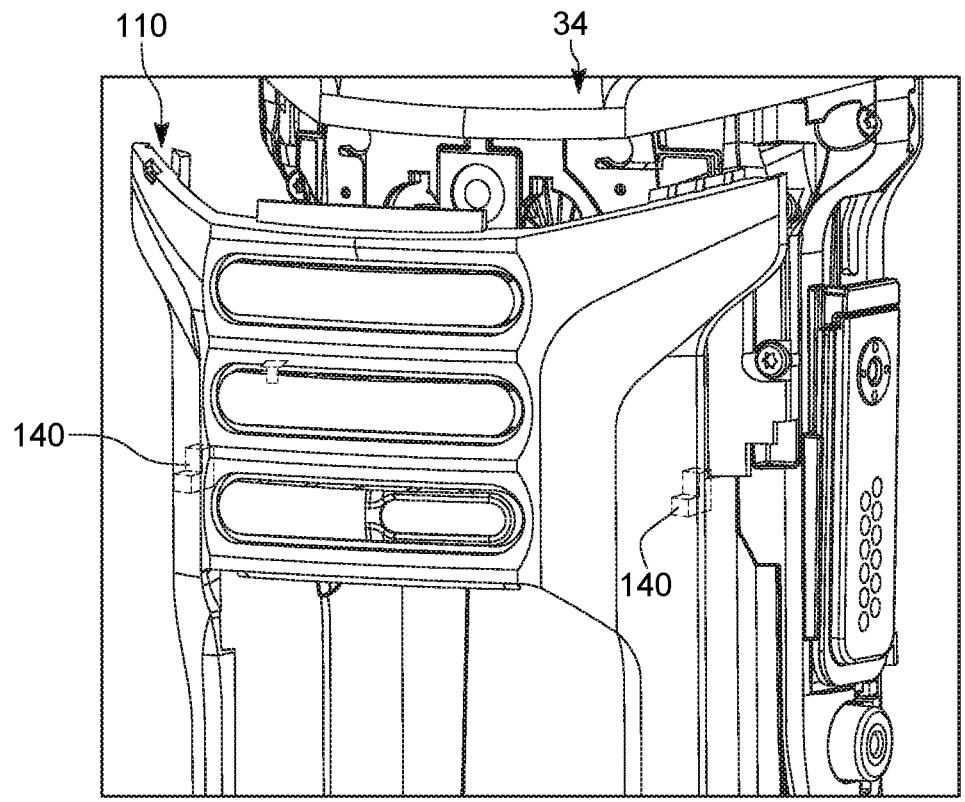
Figure 18:
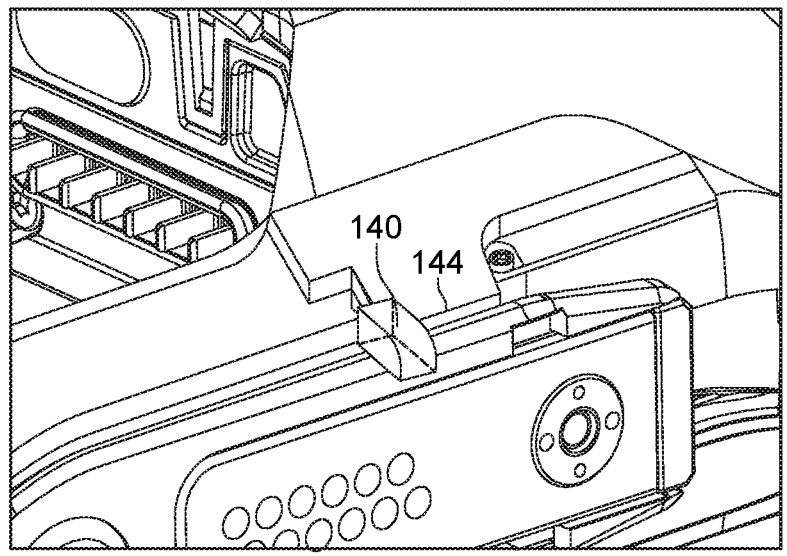

The inner radio core 34 may include threaded apertures sized to receive portions of the fasteners 148, and the housing components may similarly include apertures. For example, as illustrated in FIGS. 8 and 15, the housing components may include regions having apertures 152 sized to receive the fasteners 148.

Overall, the housing components may provide a rugged, outer protective shell for the radio device 10, and provide customization options for the end user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio comprising:
an inner radio core having a main frame assembly and at least one water-sealed sub-assembly sealed to the main frame assembly, wherein the inner radio core is an independently testable and functional radio; and
at least one customizable housing component configured to be releasably coupled to the inner radio core via at least one hook, tab, or fastener;
wherein the at least one water-sealed sub-assembly includes a display sub-assembly sealed to the main frame assembly via a front perimeter seal on the main frame assembly, a loudspeaker and antenna sub-assembly sealed to the main frame assembly via a rear perimeter seal on the main frame assembly, and a top sub-assembly sealed to the main frame assembly via a top perimeter seal on the main frame assembly.

2. The radio of claim 1, wherein the front perimeter seal is a self-retained, front perimeter seal, and wherein the display sub-assembly is in physical contact with the front perimeter seal to seal the display sub-assembly to the main frame assembly.

3. The radio of claim 1, wherein the rear perimeter seal is a self-retained, rear perimeter seal, and wherein the loudspeaker and antenna sub-assembly is in physical contact with the rear perimeter seal to seal the loudspeaker and antenna sub-assembly to the main frame assembly.

4. The radio of claim 1, wherein the top sub-assembly includes at least one of a volume control knob or channel selection knob, wherein the top perimeter seal is a self-retained, top perimeter seal, and wherein the top sub-assembly is in physical contact with the top perimeter seal to seal the top sub-assembly to the main frame assembly.

5. The radio of claim 1, wherein the main frame assembly includes a printed circuit board and an accessory connector.

6. The radio of claim 1, wherein each of the front, rear, and top perimeter seals are self-retained silicone seals.

7. The radio of claim 1, wherein the at least one customizable housing component includes a front housing component configured to at least partially cover the display sub-assembly and a rear housing component configured to at least partially cover the loudspeaker and antenna sub-assembly.

8. The radio of claim 1, wherein the at least one customizable housing component includes a plurality of user-selectable plastic elements each having a different color corresponding to a different end use of the radio.

9. The radio of claim 8, wherein the at least one customizable housing component includes a set of first color plastic housing components configured to be coupled to the inner radio core when the radio is to be used for a first end use, a set of second color housing components configured to be coupled to the inner radio core when the radio is to be used for a second end use, and a set of third color housing components configured to be coupled to the inner radio core when the radio is to be used for a third end use.

10. The radio of claim 1, wherein the at least one customizable housing component includes an aperture sized to receive a screw, and wherein the inner radio core includes a threaded aperture sized to receive the screw to releasably couple the customizable housing component to the inner radio core.

11. The radio of claim 1, wherein the loudspeaker and antenna sub-assembly includes a loudspeaker, and wherein the at least one customizable housing component includes a speaker bezel having a top member configured to cover the loudspeaker, and two legs extending below the top member.

12. The radio of claim 11, wherein the radio further includes a battery, wherein a bottom of each of the two legs includes an aperture sized to receive a screw, and wherein each of the two legs provides alignment for the battery.

13. The radio of claim 1, wherein the at least one customizable housing component includes two plastic bezels mechanically interlocked together.

14. The radio of claim 13, wherein the two plastic bezels are interlocked via overlapping tabs disposed along the plastic bezels.

15. The radio of claim 13, wherein the two plastic bezels are interlocked via hooks along the plastic bezels.

16. The radio of claim 13, wherein the plastic bezels are interlocked via screws having screw heads, and wherein the radio further includes a battery coupled to the inner radio core, wherein the battery covers the screw heads such that the screw heads are concealed.

17. The radio of claim 13, further comprising two additional plastic bezels that are interlocked to the inner radio core via at least one of a hook, tab, or fastener.

18. The radio of claim 1, wherein the at least one customizable housing component includes a first plastic bezel, a second plastic bezel, a third plastic bezel, and a fourth plastic bezel, wherein the first and third plastic bezels are interlocked directly with the inner radio core, and wherein the second and fourth plastic bezels are each interlocked directly with the first and third plastic bezels.

19. A method of assembling and testing a radio, the method comprising:
providing a plurality of seals along perimeter portions of a main frame assembly;
providing independent sealing to a plurality of radio sub-assemblies to form a plurality of independently water-sealed sub-assemblies, the plurality of water-sealed sub-assemblies being attachable to the main frame assembly and including a display sub-assembly, a loudspeaker and antenna sub-assembly, and a top sub-assembly;
attaching the water-sealed sub-assemblies to the main frame assembly, thereby sealing the water-sealed sub-assemblies to the main frame assembly to form a fully functional inner radio core, wherein the step of attaching includes sealing the display sub-assembly to the main frame assembly via a front perimeter seal on the main frame assembly, sealing the loudspeaker and antenna sub-assembly sealed to the main frame assembly via a rear perimeter seal on the main frame assembly, and sealing the top sub-assembly sealed to the main frame assembly via a top perimeter seal on the main frame assembly;
electrically and mechanically testing the inner radio core; and
attaching at least one customizable exterior housing to the inner radio core after conducting the testing.

20. A radio comprising:
an inner radio core having a main frame assembly and at least one water-sealed sub-assembly sealed to the main frame assembly, wherein the inner radio core is an independently testable and functional radio; and
at least one customizable housing component configured to be releasably coupled to the inner radio core via at least one hook, tab, or fastener;
wherein the at least one water-sealed sub-assembly includes a loudspeaker, wherein the at least one customizable housing component includes a speaker bezel having a top member configured to cover the loudspeaker and two legs extending below the top member, wherein the radio further includes a battery, wherein a bottom of each of the two legs includes an aperture sized to receive a screw, and wherein each of the two legs provides alignment for the battery.

* * * * *